United States Patent
Suri et al.

(10) Patent No.: US 7,962,647 B2
(45) Date of Patent: Jun. 14, 2011

(54) APPLICATION DELIVERY CONTROL MODULE FOR VIRTUAL NETWORK SWITCH

(75) Inventors: Salil Suri, Bangalore (IN); Harish Chilkoti, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 131 days.

(21) Appl. No.: 12/276,676

(22) Filed: Nov. 24, 2008

(65) Prior Publication Data
US 2010/0131636 A1 May 27, 2010

(51) Int. Cl.
*G06F 13/00* (2006.01)
(52) U.S. Cl. ......... 709/238; 709/241; 709/224; 718/105
(58) Field of Classification Search .................. 709/224, 709/238, 241; 718/105, 104, 102, 100, 1
See application file for complete search history.

(56) References Cited

U.S. PATENT DOCUMENTS

| 7,633,864 | B2 * | 12/2009 | Johnson et al. | 370/230 |
| 7,826,359 | B2 * | 11/2010 | Tripathi et al. | 370/230 |
| 2008/0155676 | A1 * | 6/2008 | Johnson et al. | 726/13 |
| 2009/0238072 | A1 * | 9/2009 | Tripathi et al. | 370/235 |

OTHER PUBLICATIONS

Sunay Tripathi et al.; Crossbow: From Hardware Virtualized NICs to Virtualized Networks; VISA '09; pp. 53-61; Aug. 17, 2009.*
VMware Virtual Networking Concepts; Technical Resource Center; VMware; pp. 1-12; Jul. 29, 2007.*

* cited by examiner

*Primary Examiner* — Kenneth R Coulter

(57) ABSTRACT

A virtualized platform includes a virtual switch connected to the virtual network interface cards (vNICs) for a group of virtual machines running the same application program that is associated with multiple software ports. A module in the virtualized platform monitors the virtual switch's receipt of a network packet that includes control information relating to the application program and its software ports. The module applies a load balancing algorithm to select a vNIC from the vNICs connected or connectable to the virtual switch, based on the rate of processing of previous network packets by each the vNICs (e.g., as measured by the size of a network packet queue). The module might also apply the load balancing algorithm to select a software port for the application. The module then causes the virtual switch to route the network packet to the selected vNIC and software port.

11 Claims, 10 Drawing Sheets

APPLICATION DELIVERY CONTROL MODULE FOR VIRTUAL NETWORK SWITCH

BACKGROUND

In computing, it is often useful to think of virtualization (defined broadly in this application to include paravirtualization) as falling into two major categories: platform or machine virtualization and resource virtualization. Typically, platform virtualization involves the creation of a virtual machine through the use of a software abstraction layer which separates an operating system from its hardware resources in terms of processing (e.g., CPU), memory, and I/O (e.g., storage, BIOS, etc.). In some implementations, the abstraction layer extends to network I/O, e.g., through the use of software abstractions such as virtual network interface cards (vNICs) and virtual switches. It will be appreciated that the virtual machine in platform virtualization is a hardware or system virtual machine as opposed to a process or application virtual machine such as the Java Virtual Machine. Examples of platform virtualization include the VMware ESX™ and Citrix XenServer™ hypervisors, both of which enable virtualization for platforms based on the x86 and x86-64 architectures (e.g., platforms in which the "guest" operating system might be non-Itanium Linux™ or Windows™). Informally, one might think of platform virtualization as creating a "virtualized environment" or as "making one machine work as many machines"

Resource virtualization involves the virtualization of specific system resources, such as storage volumes or network resources. Typically, resource virtualization does not involve the creation of virtual machines with guest operating systems. Examples of resource virtualization include Beowolf cluster virtualization and the Linux™ Virtual Server (LVS), which creates a load-balanced virtual server from a cluster of Linux™-based physical servers, without recourse to virtual machines with guest operating systems. Informally, one might think of resource virtualization as making "many machines look as one machine".

It will be appreciated that load balancing is a technique to spread work among two or more computers, microprocessors, or other resources such as hard drives or network connections, in order to achieve a more optimal resource utilization, throughput, response time, uptime, etc. It is often used to spread work among a cluster of servers running the same application program, e.g., an Internet server program, database server program, or other application that tends to involve a large amount of I/O. Usually load-balancing functionality is provided by a dedicated program or hardware device. Examples of such hardware devices are the Citrix NetScaler™ and the F5 BIG-IP™, which operate at layers 4-7 of the of the Open Systems Interconnection Basic Reference (OSI) Model and are referred to as application switches. These hardware devices were not originally designed for virtualized platforms and are not optimized to perform with vNICs, virtual switches, etc. That is to say, these hardware devices are not "virtualization aware". Further, they tend to be relatively expensive.

In particular implementations of the ESX™ hypervisor, virtual switches enable load balancing to spread the network traffic from one or more vNICs in an arrangement that is referred to as NIC teaming. See *VMware™ Virtual Networking Concepts* (VMware Inc., 2007), which is incorporated by reference herein. When NIC teaming is in place, one can use load balancing to choose a physical NIC for routing based on: (a) the originating virtual switch port ID; (b) a hash of the source MAC (Media Access Control) address; or (c) a hash of the source and destination IP (Internet Protocol) addresses. Load balancing in conjunction with NIC teaming makes use of and is constrained by a network packet's control information for layer 2 of the OSI Model, e.g., the data link layer.

SUMMARY

In an example embodiment, a virtualized platform includes a virtual switch connected to the vNICs for a group of virtual machines running the same application program that is associated with multiple software (e.g., TCP or UDP) ports. A module in the virtualized platform monitors the virtual switch's receipt of network packets that include control information relating to the application program and its software ports. The module applies a load-balancing algorithm to select a vNIC from the vNICs connected to the virtual switch, based on the rate of processing of previous network packets by each the vNICs (e.g., as measured by the size of a network packet queue for the vNIC). The module then causes the virtual switch to route the network packet to the selected vNIC. In an example embodiment, the module might launch a virtual machine running the application program and connect one or more vNICs associated with the virtual machine to the virtual switch, if the virtual machine is not already running when the vNIC is selected by the load balancing algorithm. Also, in an example embodiment, the module might apply the load balancing algorithm to select a software port for the application (in addition to or instead of a vNIC), based on the rate of processing of previous network packets by each of the software ports associated with the application program (e.g., as measured by the size of a network packet queue for the software port).

In an alternative example embodiment, a virtualized platform includes a virtual switch connected to the vNICs for a group of virtual machines running the same application program that is associated with multiple software (e.g., TCP or UDP) ports. A module in the virtualized platform applies a method including the operations of: (1) monitoring the virtual switch's receipt of network packets that include control information relating to the application program and its software ports; (2) applying a load-balancing algorithm to select a vNIC from the vNICs connected to the virtual switch, based on the rate of processing of previous network packets by each the vNICs (e.g., as measured by the size of a network packet queue for the vNIC); and (3) causing the virtual switch to route the network packet to the selected vNIC. In an example embodiment, the method might further include the operation of launching a virtual machine running the application program and connecting a vNIC associated with the virtual machine to the virtual switch, if the virtual machine is not already running when the vNIC is selected by the load balancing algorithm. Also, in an example embodiment, the method might include the operation of applying the load-balancing algorithm to select a software port for the application (in addition to or instead of a vNIC), based on the rate of processing of previous network packets by each of the software ports associated with the application program (e.g., as measured by the size of a network packet queue for the software port).

In yet another example, software encoded in one or more computer-readable media for execution by a processor is disclosed. The software when executed operable to receive a plurality of network packets destined for an application program running on a plurality of virtual machines. Each of the plurality of virtual machines is connected to a distributed virtual switch by a virtual network interface card. Each of the network packets includes control information relating to one or more of layers 4-7 of the Open Systems Interconnection Basic Reference (OSI) Model and wherein the distributed virtual switch enables inheritance of policies applicable to a cluster of host systems. The software when executed further operable to load balance the network packets among the plurality of virtual machines at least in part on the basis of the control information and the rate of processing of the network packets by the virtual network interface cards.

DETAILED DESCRIPTION

Figure 1:
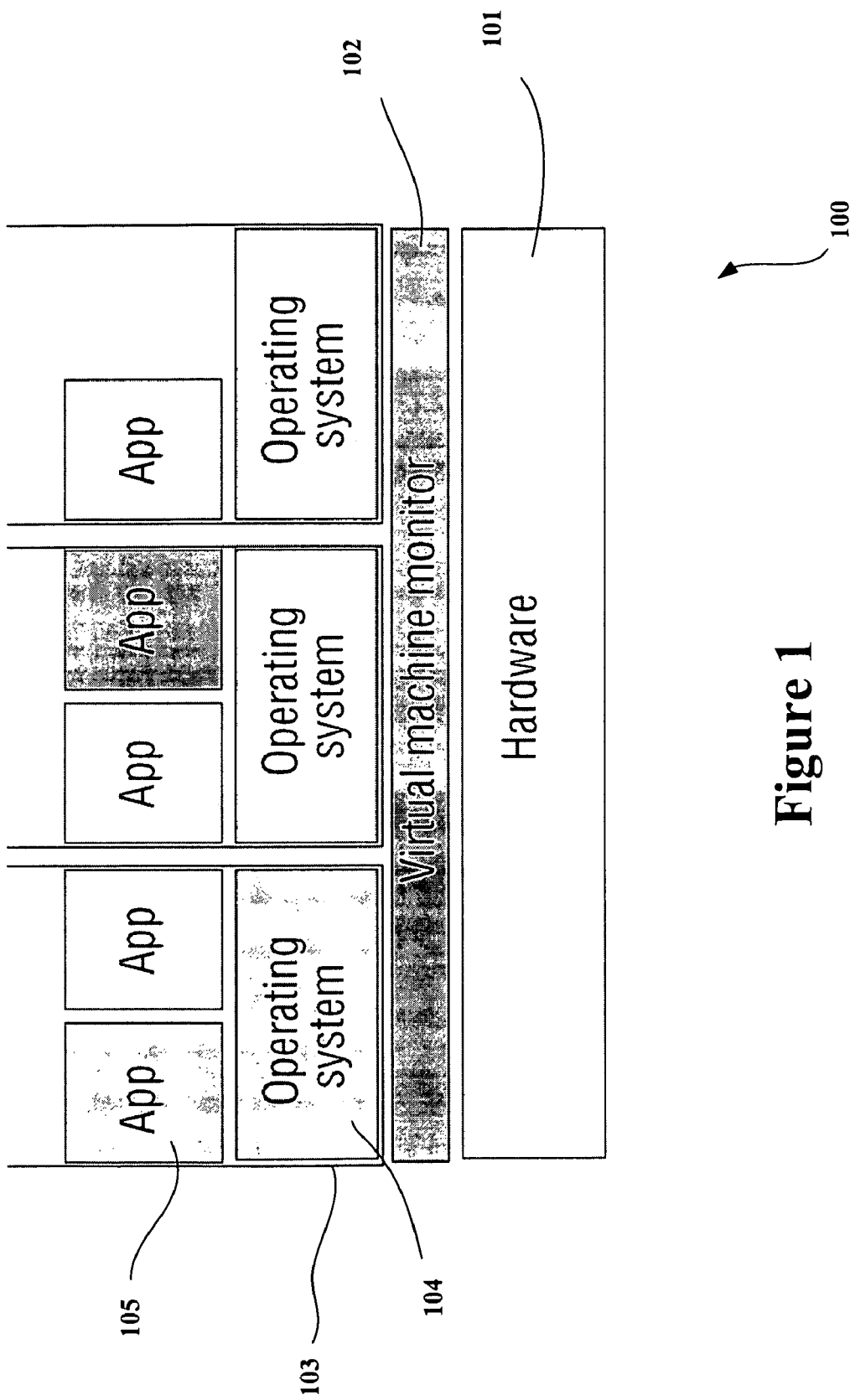
FIG. 1 is a schematic diagram illustrating platform virtualization, in accordance with one or more examples embodiment.

FIG. 1 is a schematic diagram illustrating platform virtualization, in accordance with an example embodiment. As shown in this figure, a virtualized platform 100 includes hardware 101, which might include (a) one or more CPUs (e.g., x86 or x86-64 microprocessors), (b) memory (e.g., volatile or non-persistent storage), and (c) I/O devices such as hard disk drives (e.g., persistent storage) and physical network interface cards (NICs), in an example embodiment. The virtualized platform also includes a virtual machine monitor or hypervisor 102 which functions as an operating-system control program for one or more virtual machines, such as virtual machine 103. In turn, each virtual machine (e.g., 103) comprises a guest operating system (e.g., 104) running one or more application programs such as application program 105. It will be appreciated that in an alternative example embodiment the virtual machine monitor 102 might itself run within a host operating system which interfaces more directly with hardware 101.

Figure 2:
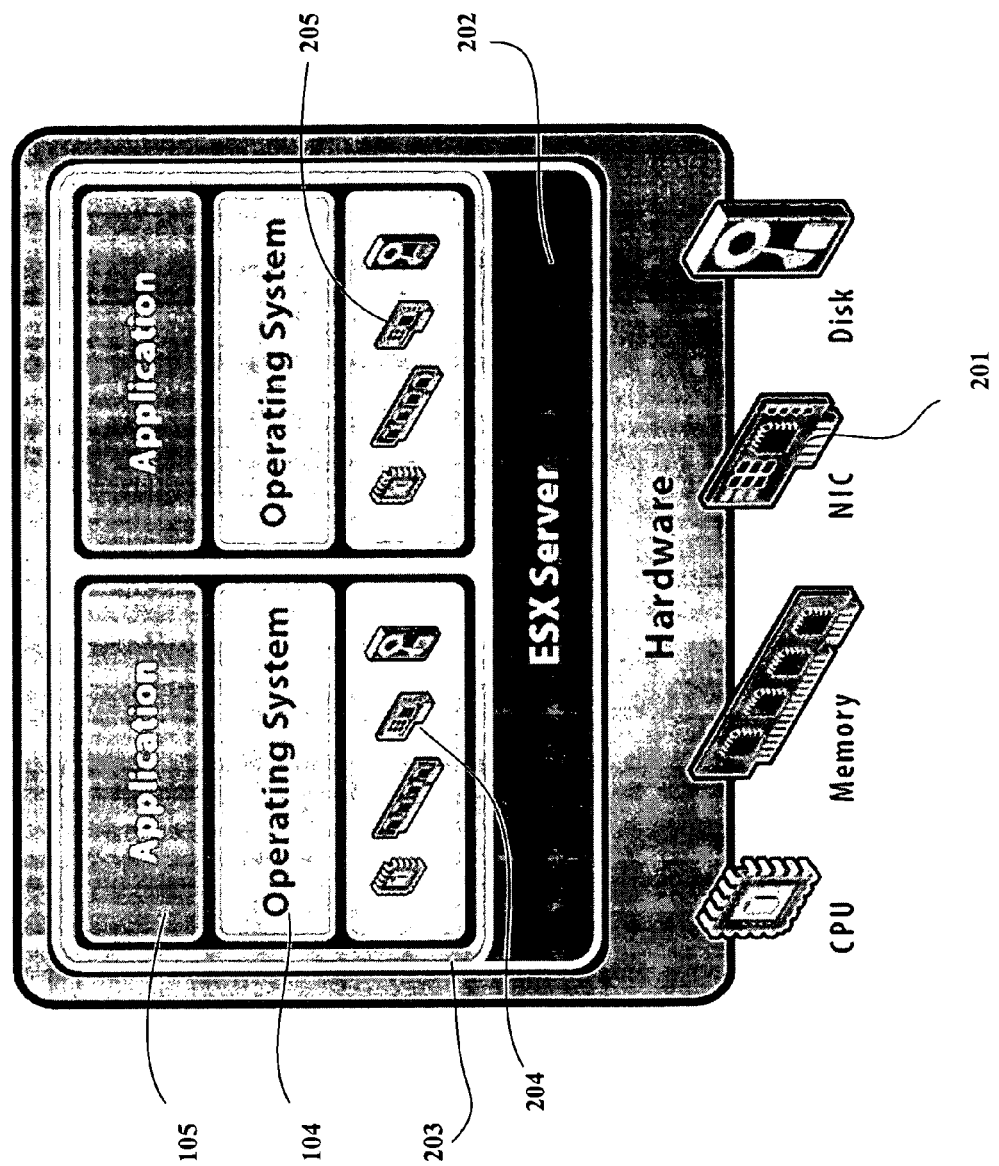
FIG. 2 is a schematic diagram illustrating the high-level architecture for a hypervisor, in accordance with one or more examples embodiment.

FIG. 2 is a schematic diagram illustrating the high-level architecture for a hypervisor, in accordance with an example embodiment. As shown in this figure, virtual machine monitor or hypervisor 202 (e.g., VMware ESX™) is running two virtual machines (e.g., 203), comprised of a guest operating system (e.g., 104) running an application program (e.g., 105). For purposes of illustration, the virtual devices in the hypervisor are depicted as attached to the individual virtual machines. Thus, virtual network interface card (vNIC) 204 is shown as part of virtual machine 203, though it might be actually implemented as a component of the hypervisor, as explained in further detail below. As depicted in FIG. 2, more than one vNIC (e.g., vNICs 204 and 205) might be associated with one physical NIC 201.

In an example embodiment, each vNIC might be a virtual Ethernet adapter (e.g., Layer 2 of the OSI Model) with its own MAC address and unicast/multicast/broadcast filter. The virtual Ethernet adapter might emulate the AMD Lance PCNet 32 Ethernet adapter or the Intel E1000 Ethernet adapter (e.g., in the case of a virtual machine comprising a guest operating system that is 64-bit.). Alternatively, the virtual Ethernet adapter might be a paravirtualized device. It will be appreciated that the speed and duplex settings found in physical networking are not relevant in a virtual network, because all the data transfer takes place in the random-access memory (RAM) of the host system (e.g., an x86 or x86-64 server running a hypervisor), nearly instantaneously and without the possibility of collisions or other signaling-related errors. It will also be appreciated that another type of vNIC, e.g., a virtual token-ring adapter as opposed to a virtual Ethernet adapter, might be used in an alternative example embodiment. Further, it will be appreciated that another type of host system, e.g., a Power architecture server (such as a Cell Broadband Engine Architecture server) running a hypervisor (or virtual machine monitor), might be used in an alternative example embodiment.

Figure 3:
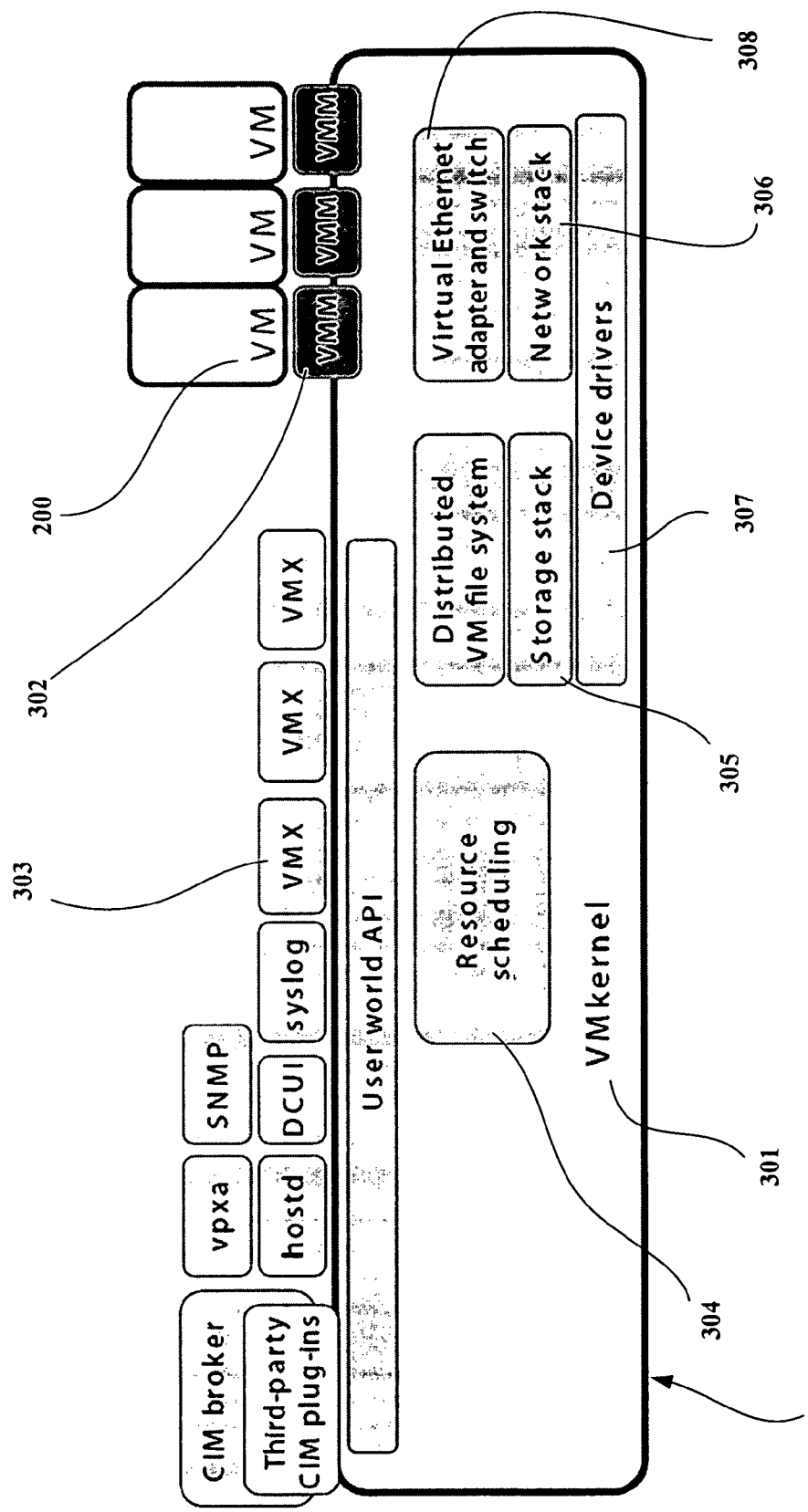
FIG. 3 is a schematic diagram illustrating the high-level software stack for a hypervisor, in accordance with one or more examples embodiment.

FIG. 3 is a schematic diagram illustrating the high-level software stack for a hypervisor, in accordance with an example embodiment. As shown in this figure, the hypervisor 202 (e.g., VMware ESX™) includes VMkernel 301, which is an operating system that is: (1) specifically designed to run multiple virtual machines (e.g., 200); (2) based to a significant extent on the Portable Operating System Interface (POSIX) standards; and (3) provides core functionality relating to resource scheduling 304 (including process creation and control, process threads, signals, file system, etc.), I/O stacks (e.g., storage stack 305 and network stack 306), and device drivers 307 for devices such as hard disk drives and physical NICs. Running on top of the VMkernel are the virtual machines (e.g., 200) each of which is associated with a virtual machine monitor (e.g., 302), which is a process that provides an execution environment for a virtual machine. Each virtual machine is also associated with a VMX helper process (e.g., 303), in an example embodiment. Further details about the other software components shown in FIG. 3 can be found in *VMware™ Virtual Networking Concepts* (VMware Inc., 2007).

Running on top of the network stack 306 are the virtual Ethernet adapters (e.g., vNICs) and virtual switches, collectively identified as 308. In the example embodiment shown in FIG. 3, a module for load balancing network traffic among vNICs and/or software ports might be located at position 308 in the software stack, where the module would have access to the vNICs and virtual switches in the hypervisor, as well as the network packets (defined broadly in this application to include data-link layer frames) stored in the RAM of the host system (e.g., an x86 or x86-64 server running the hypervisor). In other example embodiments, the load-balancing functionality described below might be located in an appliance virtual machine or in server management software, both of which are described further below.

Figure 4A:
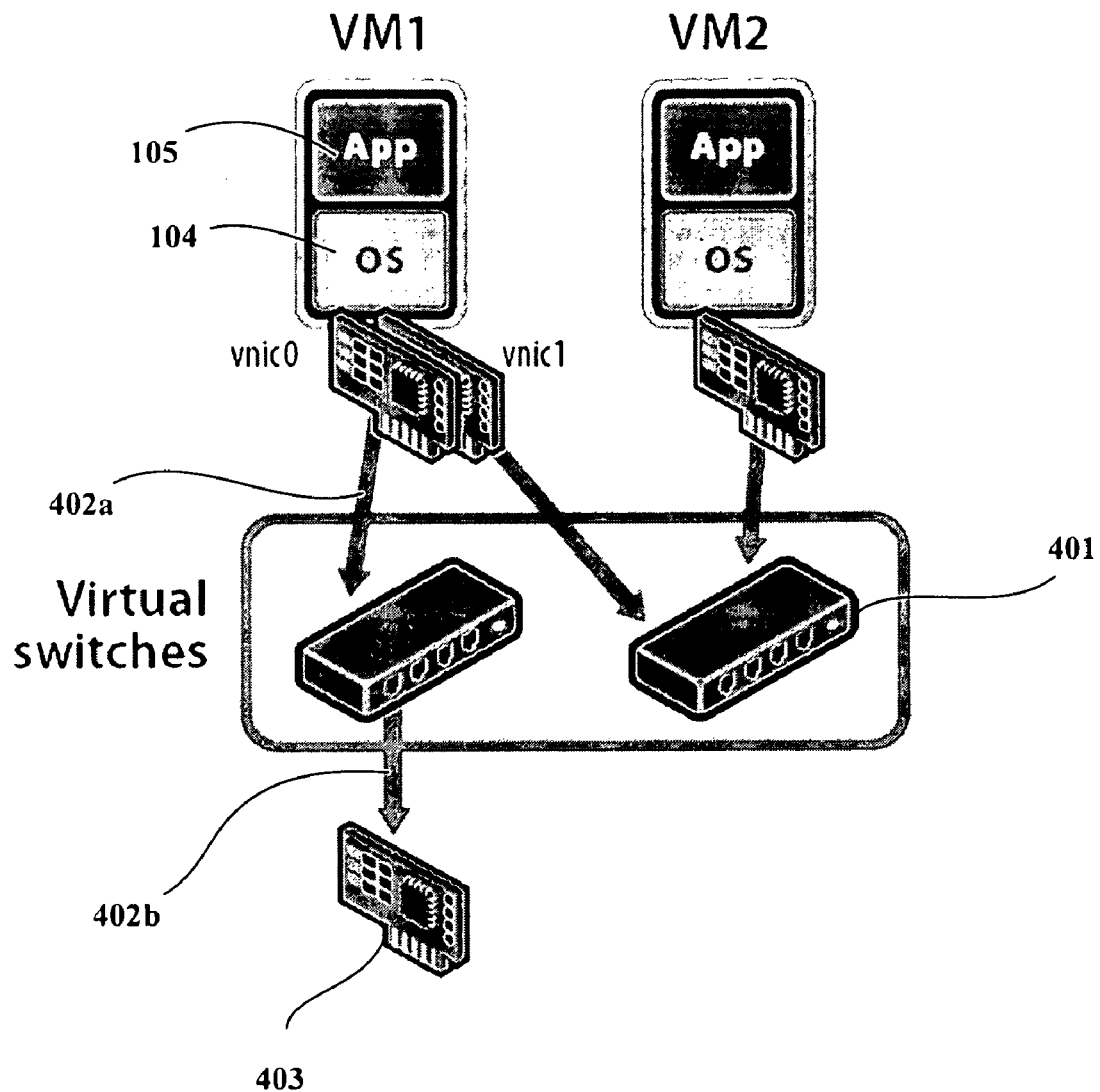
FIGS. 4A and 4B are schematic diagrams illustrating the relationship between virtual machines, vNICs, virtual switches, and physical NICs, in accordance with one or more examples embodiment.

FIG. 4A is a schematic diagram illustrating the relationship between virtual machines, vNICs, virtual switches, and physical NICs, in accordance with an example embodiment. As shown in this figure, a virtual machine (e.g., VM1) might include a guest operating system (e.g., 104) running an application program (e.g. 105) and might be associated with one or more vNICs (e.g., vnic0 and vnic1). In turn, each of these vNICs might be connected to a virtual switch (e.g., 401) through the use of a virtual port 402a. Further, as indicated in FIG. 4, each the vNICs for a particular virtual machine might be associated with a different virtual switch. Also, a virtual switch might be associated with one or more virtual ports (e.g., 402b) connected to a physical NIC 403. As shown in FIG. 4, some virtual switches (e.g., 401) might not connect to a physical network and thus have no virtual port connected to a physical NIC. This might be the case, for example, for a virtual switch that provides connections between a firewall virtual machine and the virtual machines protected by the firewall.

In an example embodiment, a virtual switch might work in much the same way as a physical (e.g., Ethernet) switch. That is, a virtual switch might perform the following operations: (1) maintaining a MAC port forwarding table; (2) looking up a frame's destination MAC (e.g., in the frame's layer 2 Ethernet header) when the frame arrives; (3) forwarding a frame to one or more ports for transmission; and (4) avoiding unnecessary deliveries (e.g., the virtual switch is not a hub). Further, the ports on a virtual switch provide logical connection points among virtual devices and between virtual and physical devices. One might think of the ports on a virtual switch as virtual registered jack (RJ) connectors. Virtual switch ports provide a control channel for communication with the vNICs (e.g., virtual Ethernet adapters) attached to them since the virtual switch ports: (a) know authoritatively what the configured receive filters are for attached vNICs (e.g., no MAC learning is required to populate forwarding tables); and (2) know authoritatively the "hard" configuration of attached vNICs (unlike physical switches). This capability makes it possible to set policies such as "guest operating system cannot change MAC address" because the virtual switch port knows what is "burned into ROM" (e.g., stored in the configuration file, outside control of the guest operating system). Also, this capability allows the virtual switch to dispense with the physical-switch tasks of learning unicast addresses or performing Internet Group Management Protocol (IGMP) snooping to learn multicast group membership.

In an example embodiment, a physical NIC might connect to a virtual switch through a virtual port when the physical NIC is initialized by a device driver or when the teaming policies for a virtual switch are reconfigured. A vNIC (e.g., a virtual Ethernet adapter) might connect to a virtual switch through a virtual port: (a) during powering on of the virtual machine on which the vNIC is configured; (b) during an explicit action to connect the vNIC; or (c) during migration of a virtual machine using VMotion™ (e.g., live migration of a virtual machine from one physical server to another with minimal down-time). A vNIC (e.g., a virtual Ethernet adapter) updates the virtual port with MAC filtering information when it is initialized and whenever it changes. A virtual port might ignore any requests from the vNIC (e.g., a virtual Ethernet adapter) that would violate the Layer 2 security policy in effect for the virtual port, in an example embodiment. For example, if the policy is that MAC spoofing is blocked, the virtual port might drop any packets which violate that policy In an example embodiment, each virtual switch might have up to approximately 1,016 virtual ports, with a limit of approximately 4,096 virtual ports on all virtual switches on a host system (e.g., an x86 or x86-64 server running a hypervisor). Further, a single host system might have a maximum of approximately 32 physical NICs (e.g., Ethernet adapters), which might be on one virtual switch or distributed among a number of virtual switches.

Figure 4B:
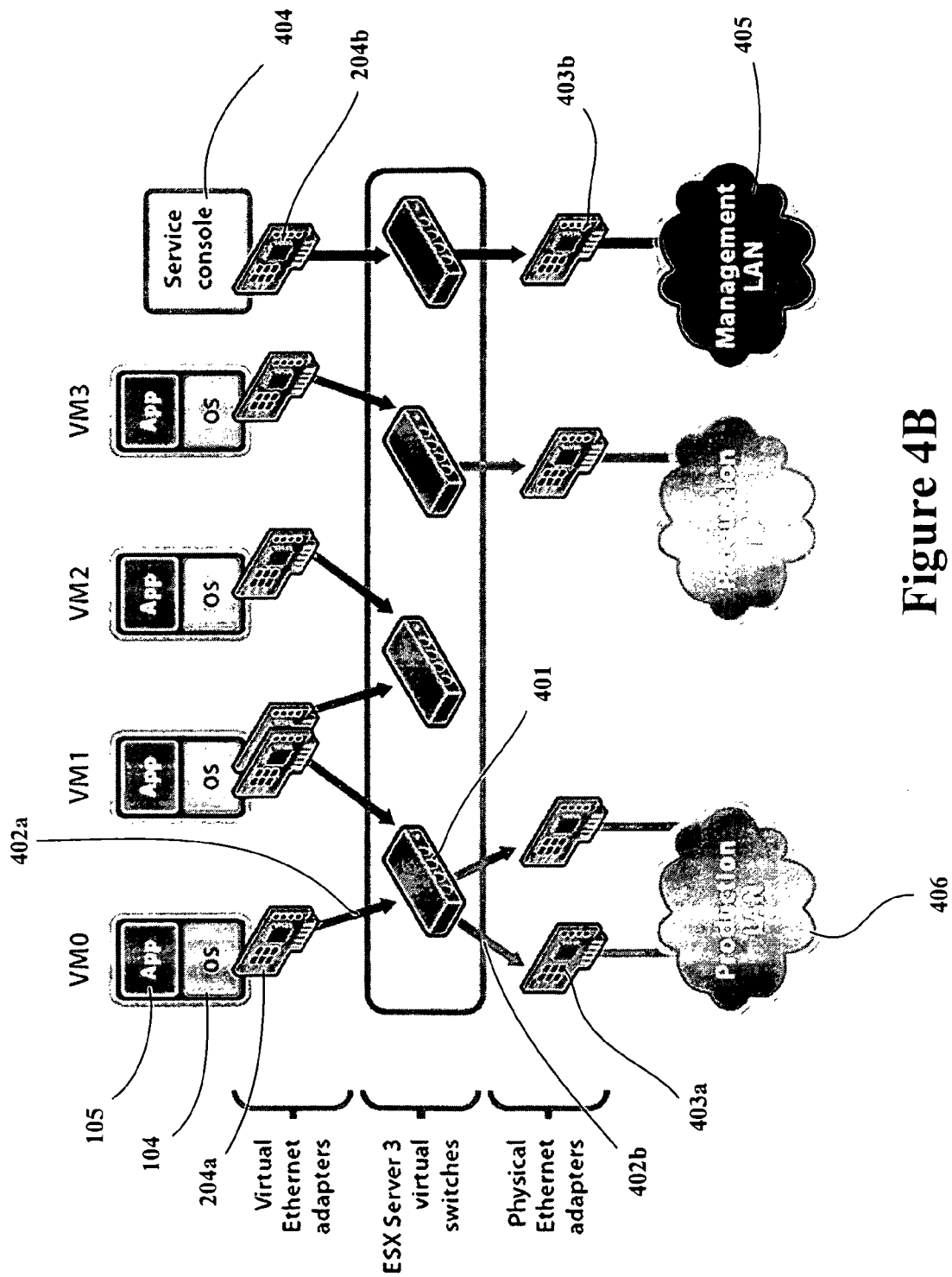

To some extent, FIG. 4B is an extension of FIG. 4A. As shown FIG. 4B, a virtual machine (e.g., VM0), comprising a guest operating system (e.g., 104) running an application program (e.g. 105), might be associated with one or more vNICs (e.g., 204a). In turn, each of these vNICs might be associated with a virtual switch (e.g., 401) through the use of a virtual port 402a. Also, a virtual switch might be associated with one or more virtual ports (e.g., 402b) associated with a physical NIC 403a. In an example implementation, one or more of the physical NICs (e.g., 403a) might connect a virtual machine (e.g., VM0) with a vNIC (e.g., 204a) to a production LAN (local area network) 406. It will be appreciated that a production LAN is a live network that is engaged in the processing of network transactions. Also, as shown in FIG. 4B, one or more of the physical NICs (e.g., 403b) might connect a service console 404 (e.g., a management interface which might comprise a graphical user interface or GUI) with a vNIC 204b to a management LAN 405. It will also be appreciated that the functionality provided by vNIC 204a and vNIC 204b might be similar, but not identical, in an example embodiments, as explained in *VMware™ Virtual Networking Concepts* (VMware Inc., 2007), incorporated by reference.

Figure 5:
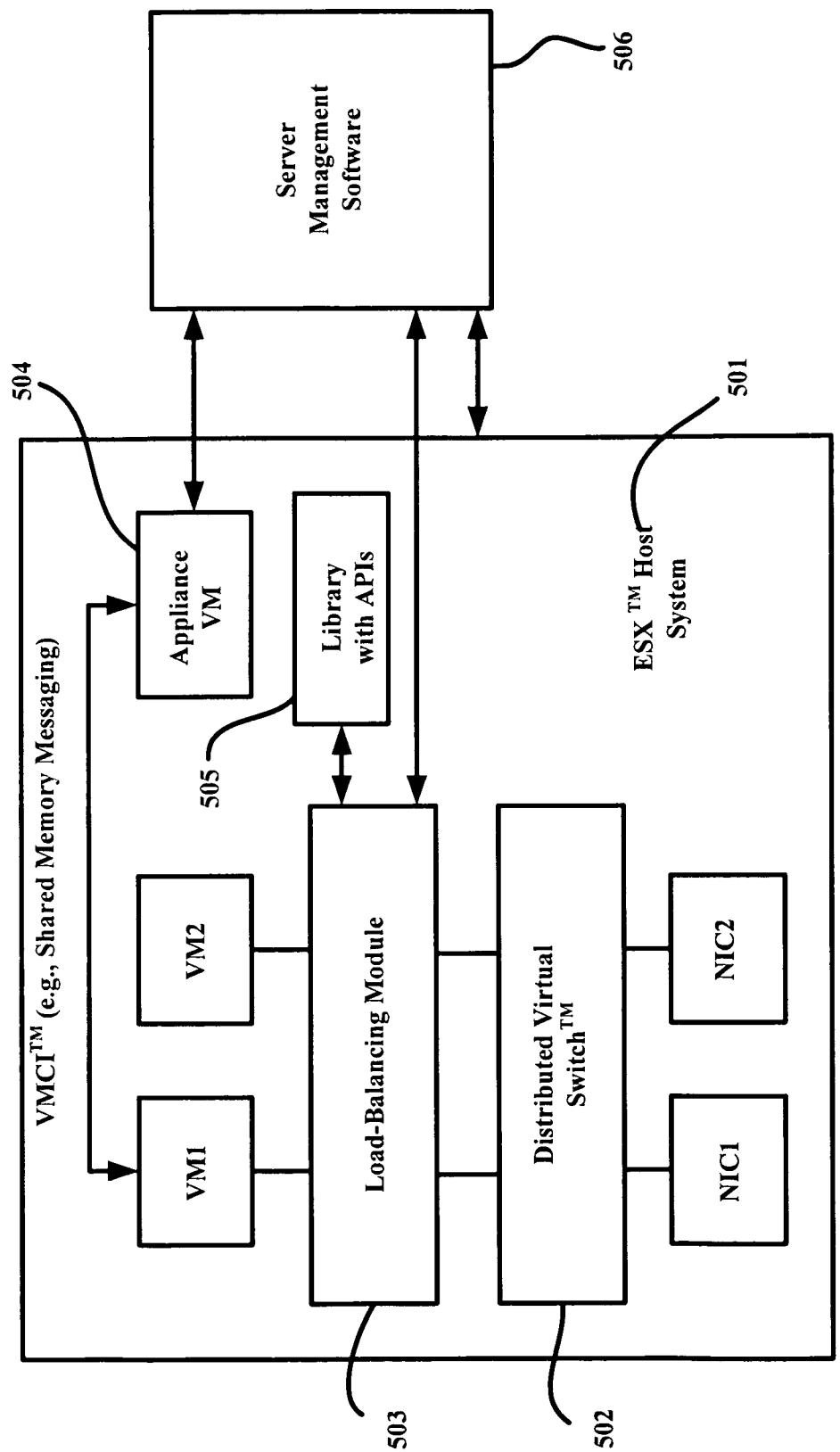
FIG. 5 is a schematic diagram illustrating a host system with an appliance virtual machine, in accordance with one or more examples embodiment.

FIG. 5 is a schematic diagram illustrating a host system with an appliance virtual machine, in accordance with an example embodiment. As depicted in this figure a host system (e.g., an x86 or x86-64 server running a hypervisor) 501 includes a Distributed Virtual Switch (DVS™) 502 which is associated with two physical NICs (e.g., NIC1 and NIC2) and which is controlled by a load-balancing module 503. The DVS™ functionality allows a virtual switch to inherit policies configured at the level of a cluster of host systems rather than at the level of a single host system. The load-balancing module 503 is accessible by a library of application programming interfaces (APIs) 505, which might by used by third party vendors to enhance the functionality of their products, for example, a "virtualization-unaware" hardware appliance for load balancing. The host system also includes an appliance virtual machine 504, which might provide functionality for reporting load-balancing results and performing corrective actions based on those results, in an example embodiment. It will be appreciated that the appliance virtual machine is a software component as opposed to a hardware device. As depicted in FIG. 5, the appliance virtual machine 504 is in communication with a server management software 506, which enables centralized management and resource optimization of multiple host systems and provides a graphical user interface (GUI) for the user (e.g., a systems administrator).

Also as depicted in FIG. 5, the appliance virtual machine 504 communicates with the virtual machines (e.g., VM1) on the host system through shared-memory messaging, such as that enabled by a Virtual Machine Communication Interface (VMCI™). In an example embodiment, the appliance virtual machine 504 might monitor and report results on a virtual machine's network traffic and health (e.g., metrics related to availability and/or performance) to the server management software 506. It will be appreciated that by providing this functionality, the appliance virtual machine 504 frees up the hypervisor to perform other tasks such as resource scheduling.

Figure 6:
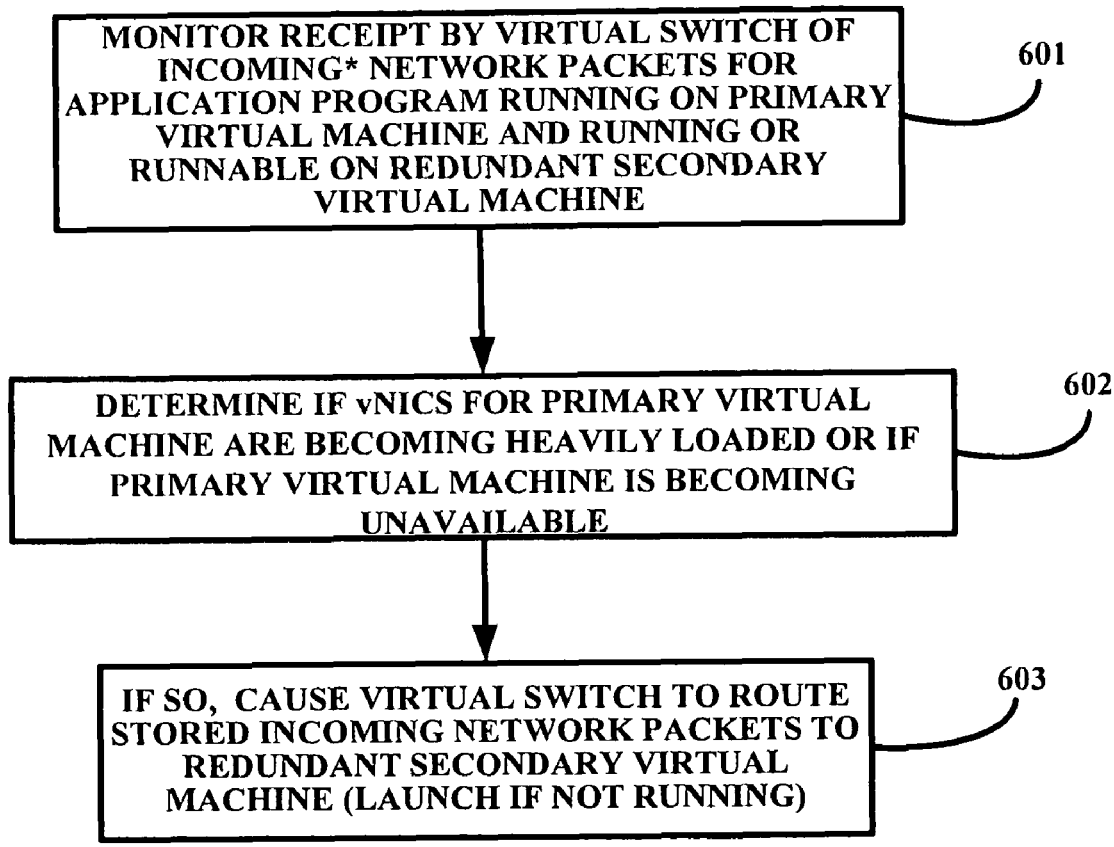
FIG. 6 is a flowchart diagram showing a process for transferring incoming network packets from a primary virtual machine to a secondary virtual machine, in accordance with one or more examples embodiment.

FIG. 6 is a flowchart diagram showing a process for transferring incoming packets from a primary virtual machine to a secondary virtual machine, in accordance with an example embodiment. It will be appreciated that this process might be used to implement a high-availability (e.g., fault-tolerant) cluster of virtual machines. In an example embodiment, this process might be employed by the load-balancing module described elsewhere in this application, although the process could be employed by other components of a hypervisor's software stack, in alternative example embodiments. In the process's first operation 601, the load-balancing module monitors the receipt by a virtual switch of incoming network packets for an application program running on a primary virtual machine and running or runnable on a redundant secondary virtual machine. As indicated earlier, the incoming network packets will be stored for a period of time in the RAM of the host system (e.g., an x86 or x86-64 server running a hypervisor). Consequently, this monitoring will not require the use of time-consuming queries to cluster nodes, as is the case with the LVS. And the network packets that make up a logical grouping (e.g., per session) will be available for transmission to a redundant virtual machine running the same application program as the primary machine, in an example embodiment. In an alternative example embodiment, per-session data related to network packets might be stored on the client that sent the network packet, e.g., through the use of a browser cookie or uniform resource locator (URL) engine.

In the process's second operation 602, the load-balancing module determines if the vNICS (e.g., virtual Ethernet adapters) for the primary virtual machine are becoming heavily loaded with incoming network packets or if the primary virtual machine is becoming unavailable. If so, in the process's third operation 603, the load-balancing module causes the virtual switch to route the stored incoming network packets to a redundant secondary virtual machine running the same application program. In the event that such a redundant secondary virtual machine is not already running, the load-balancing module might launch the redundant secondary virtual machine and the application. In an example embodiment, the load-balancing module might perform the launch using functionality, such as (a) advanced host profiling, e.g., with a template for a virtual machine stored in a virtual-machine library, VMCI™, and DVS™, or (b) VMotion™. Here it will be recalled that the VMCI™ described above permits the hypervisor to perform operations on an application program running on a guest operating system using messages in shared memory and that the DVS™ described above allows a virtual switch to inherit policies configured at the level of a cluster of host systems rather than at the level of a single host system. As indicated in FIG. 6, the process shown in the figure would work equally well with outgoing network packets from an application program. In this regard, the load-balancing module might associate each virtual machine running an application with a particular transmit/receive queue in a physical NIC with multiple transmit/receive queues, in an example embodiment.

Figure 7:
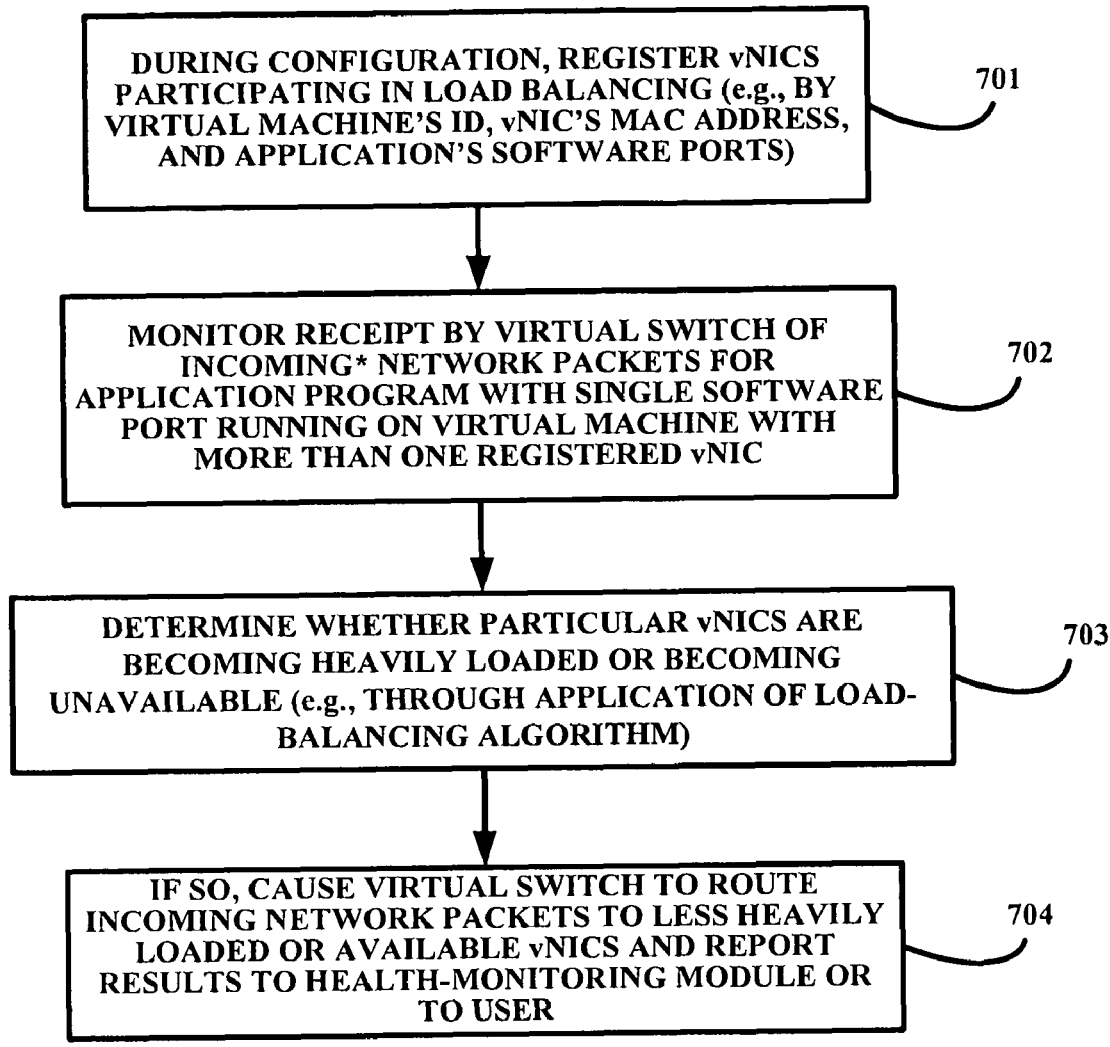
FIG. 7 is a flowchart diagram showing a process for load balancing incoming network packets on a virtual machine having multiple vNICs and running an application with a single software port, in accordance with one or more examples embodiment.

FIG. 7 is a flowchart diagram showing a process for load balancing incoming network packets on a virtual machine having multiple vNICs and running an application with a single software port, in accordance with an example embodiment. In the process's first operation 701, the load-balancing module registers the vNICs participating in load balancing, during each vNIC's configuration. In an example embodiment, this registration might include: (a) a virtual machine ID for the vNIC; (b) the vNIC's MAC address; and (c) a TCP/UDP port for an application program which is running or might run on the virtual machine. It will be appreciated that TCP/UDP ports are software ports associated with layer 4 (e.g., the transport layer) of the OSI model. In the process's second operation 702, the load-balancing module monitors the receipt by a virtual switch of incoming network packets for an application program with a single software port running on a virtual machine with more than one registered vNIC. As noted earlier, the incoming network packets will be stored for a period of time in the RAM of the host system (e.g., an x86 or x86-64 server running a hypervisor). In the process's third operation 703, the load-balancing module determines whether particular registered vNICs are becoming heavily loaded or unavailable, e.g., through the application of a load-balancing algorithm that depends upon dynamic feedback. If so, in the process's fourth operation 704, the load-balancing module causes the virtual switch to route the incoming network packets to less heavily loaded or available vNICs and report the results to a health-monitoring module or to the user. As indicated in FIG. 7, this process would work equally well with outgoing network packets from an application program's software port. In the event that a less heavily loaded or available vNIC is not already created and connected to the virtual switch, the load-balancing module might cause such a vNIC to be created and connected to the virtual switch, using the functionality described earlier (e.g., using a virtual machine template, VMCI™, and/or DVS™) or similar functionality.

In an example embodiment, the results reporting in operation 704 might involve a daemon (e.g., a background process) which runs in the VMkernel (see 301 in FIG. 3) and which collects data related to network traffic and the health (e.g., metrics related to availability and/or performance) of the host system (e.g., its hardware, hypervisor, guest operating systems, virtual machines, application programs, etc.). Additionally or alternatively, the results reporting might involve the console service (e.g., 404) described in FIG. 4B. For example, the console service might display the results using graphics in a graphical user interface (GUI). In another alternative example embodiment, an appliance virtual machine might retrieve the results from the daemon and transmit them to server management software for display on a GUI, as described above, or even display them on the console service's GUI.

As indicated in operation 704, the load-balancing module might report the results to a health-monitoring module, in an example embodiment. In turn, the health-monitoring module might take corrective action based on the results (e.g., launching a redundant virtual machine running the same application program or using VMotion™ to move a virtual machine running an application to another host system), without involving the user, unless the corrective action fails. If the corrective action succeeds, the health-monitoring module might report that result along with the results from the load-balancing module to the user, e.g., through the use of the daemon, the console service, an appliance, and/or server management software.

Figure 8:
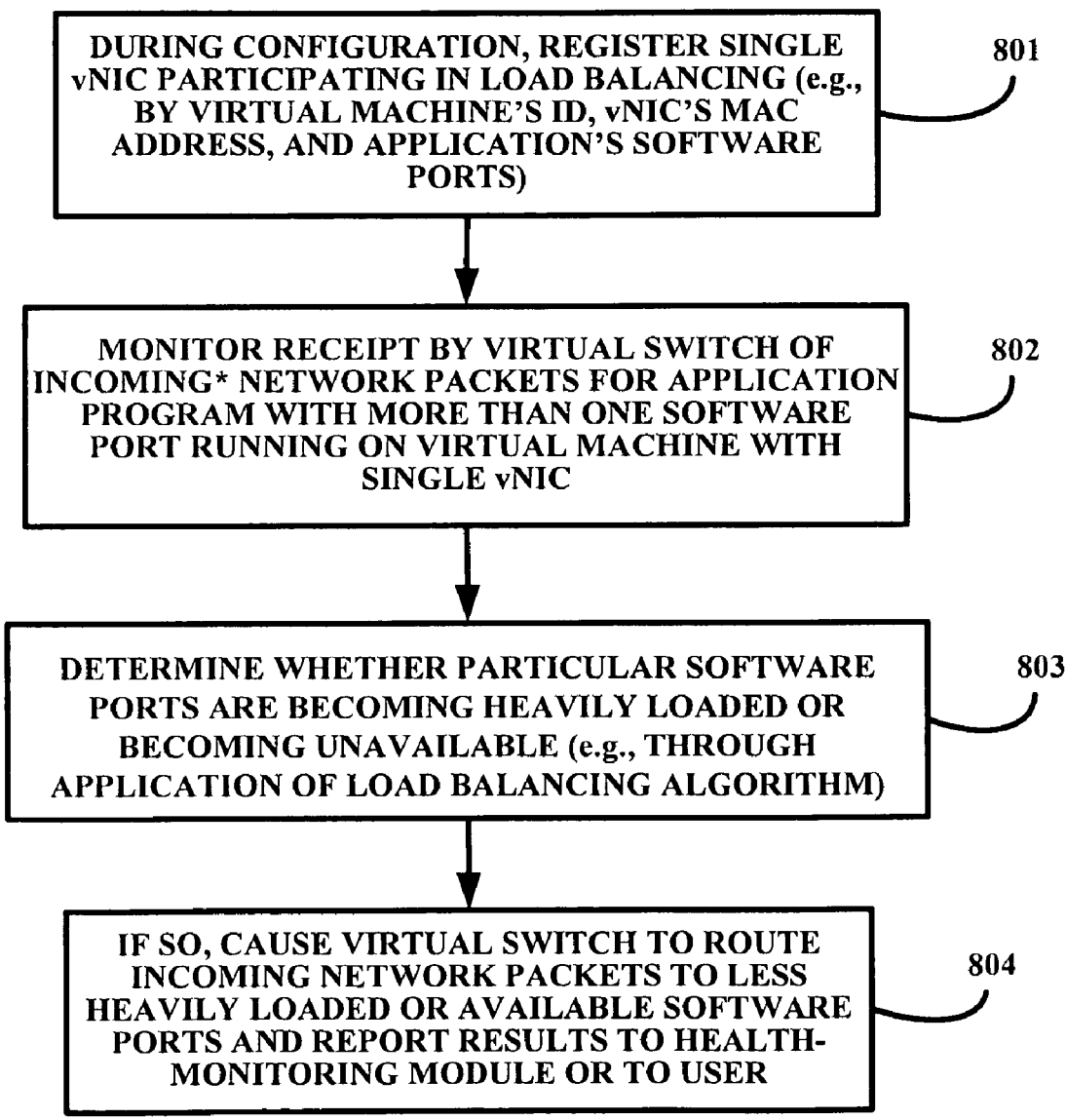
FIG. 8 is a flowchart diagram showing a process for load balancing incoming network packets on a virtual machine having a single vNIC and running an application with multiple software ports, in accordance with one or more examples embodiment.

FIG. 8 is a flowchart diagram showing a process for load balancing incoming network packets on a virtual machine having a single vNIC and running an application with multiple software ports, in accordance with an example embodiment. In the process's first operation 801, the load-balancing module registers the single vNIC participating in load balancing. In an example embodiment, this registration might include: (a) a virtual machine ID for the vNIC; (b) the vNIC's MAC address; and (c) multiple TCP/UDP ports (e.g., a software ports) for an application program which is running or might run on the virtual machine. In the process's second operation 802, the load-balancing module monitors the receipt by a virtual switch of incoming network packets for an application program with more than one software port running on a virtual machine with a single registered vNIC. In the process's third operation 803, the load-balancing module determines whether particular software ports are becoming heavily loaded or unavailable through the application of a load-balancing (or scheduling) algorithm, e.g., a load-balancing algorithm that depends upon dynamic feedback. If so, in the process's fourth operation 804, the load-balancing module causes the virtual switch to route the incoming network packets to less heavily loaded or available software ports and report the results to a health-monitoring module or to the user, as described above. As indicated in FIG. 8, this process would work equally well with outgoing network packets from an application program's software ports. In the event that a less heavily loaded or available software port is not already created and connected to the virtual switch, the load-balancing module might cause such a software port to be created using the functionality described earlier (e.g., using a virtual machine template, VMCI™, and/or DVS™) or similar functionality. It will be appreciated that the creation of a new software port might involve the launch of the application program on a different software port in a new or existing virtual machine.

Figure 9:
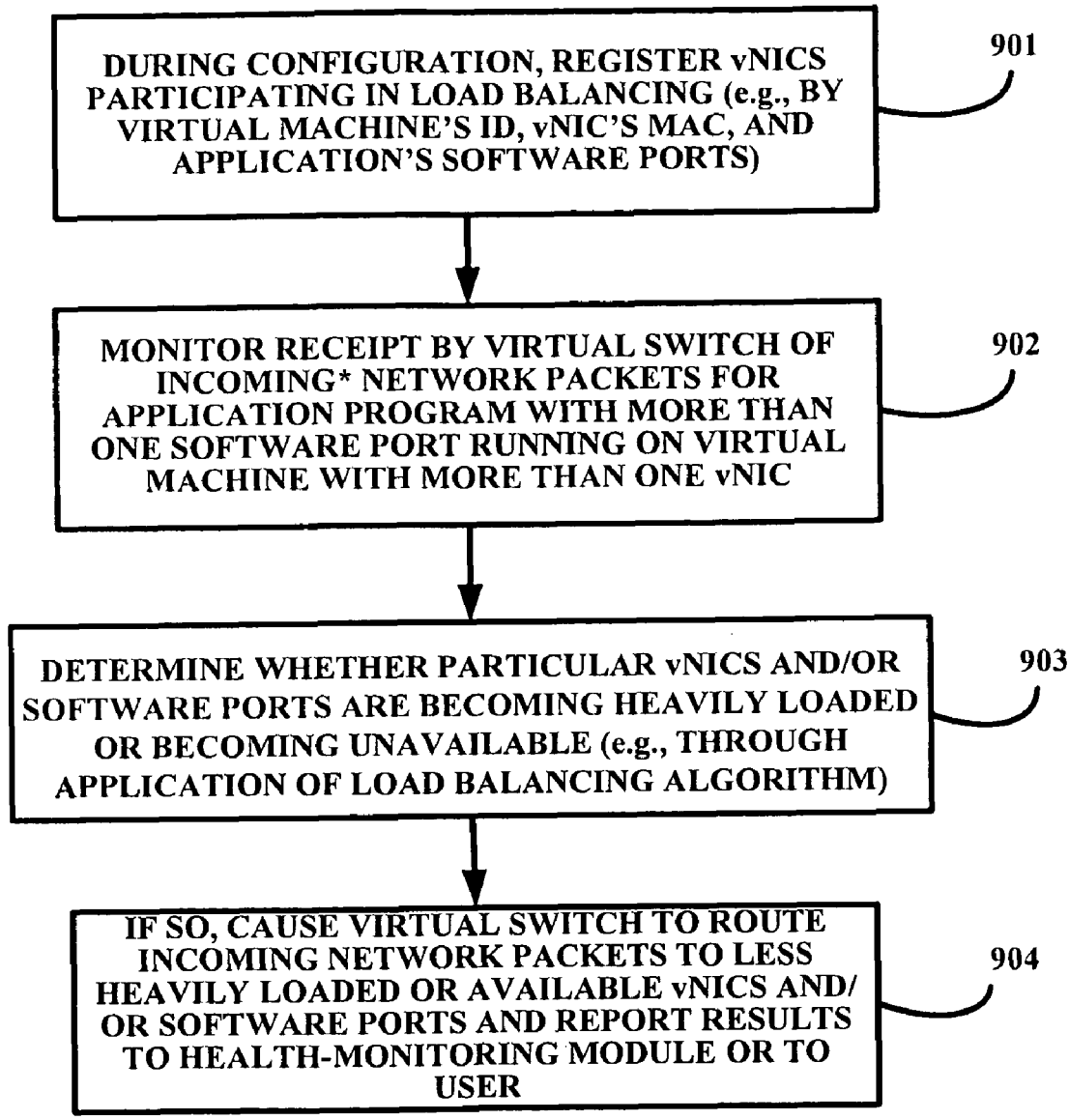
FIG. 9 is a flowchart diagram showing a process for load balancing incoming network packets on a virtual machine having multiple vNICs and running an application with multiple software ports, in accordance with one or more examples embodiment.

FIG. 9 is a flowchart diagram showing a process for load balancing incoming network packets on a virtual machine having multiple vNICs and running an application with multiple software ports, in accordance with an example embodiment. In the process's first operation 901, the load-balancing module registers the vNICs participating in load balancing, during each vNIC's configuration. In an example embodiment, this registration might include: (a) a virtual machine ID for the vNIC; (b) the vNIC's MAC address; and (c) multiple TCP/UDP ports (e.g., software ports) for an application program which is running or might run on the virtual machine. In the process's second operation 902, the load-balancing module monitors the receipt by a virtual switch of incoming network packets for an application program with more than one software port running on a virtual machine with more than one registered vNIC. In the process's third operation 903, the load-balancing module determines whether particular vNICs and/or software ports are becoming heavily loaded or unavailable through the application of a load-balancing (or scheduling) algorithm, e.g., a load-balancing algorithm that depends upon dynamic feedback. If so, in the process's fourth operation 904, the load-balancing module causes the virtual switch to route the incoming network packets to less heavily loaded or available vNICs and/or software ports and report the results to a health-monitoring module or to the user, as described above. As indicated in FIG. 9, this process would work equally well with outgoing network packets from an application program's software ports. In the event that a less heavily loaded or available vNIC or software port is not already created, the load-balancing module might cause such a vNIC or software port to be created, using the functionality described earlier (e.g., using a virtual machine template, VMCI™, and/or DVS™) or similar functionality. It will be appreciated that the creation of a new software port might involve the launch of the application program on a different software port in a new or existing virtual machine.

The operations described in FIG. 9 involve a single virtual machine. However, it will be appreciated that the operations described in that figure are equally applicable to a scenario in which multiple virtual machines with multiple vNICs are running the same software application with multiple software ports. All of the load-balancing algorithms described below and elsewhere could also be used in this scenario.

It will also be appreciated that numerous load-balancing algorithms might be employed in operation 903, including, by way of example: (1) round-robin scheduling; (2) weighted round-robin scheduling; (3) least-connection scheduling; (4) weighted least-connection scheduling; (5) locality-based least-connection scheduling; (6) locality-based least-connection with replication scheduling; (7) destination hashing scheduling; (8) source hashing scheduling; (9) shortest expected delay scheduling; and (10) never queue scheduling.

In an example embodiment, the load-balancing algorithm employed in operation 903 might make use of a network packet's control information for layers 4-7 of the OSI Model. It will be appreciated that the latter OSI layers deal with a network packet's control information related to software ports (e.g., TCP and UDP) and applications (e.g., HTTP and FTP). Additionally, the load-balancing algorithm might be based in whole or in part on the content of the payload of the network packets, like a content or application switch. In an example embodiment, the load-balancing module employs a load-balancing algorithm that depends upon dynamic feedback, which, in this instance, involves monitoring of the rate of processing by the each of the vNICs and/or by each of the software ports of the network packets stored in the RAM of the host system (e.g., as measured by the size of a network packet queue for the vNIC or the software port). Additionally or alternatively, the load-balancing algorithm might be configurable by a user to handle a particular use case. So for example, the user might configure the load-balancing algorithm to use vNICs and/or software ports in a particular sequence, in the event of heavy loading or unavailability.

Programming instructions for executing above described methods are provided. The programming instructions are stored in a computer readable media.

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C#, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

The invention claimed is:

1. A method, performed by a processor, comprising:
   implementing load balancing for both incoming and outgoing network packets, the incoming network packets being directed to one or more virtual machines via a virtual network switch, the outgoing network packets being directed from the one or more virtual machines via the virtual network switch, the load balancing including;
   (a) monitoring receipt of the incoming and outgoing network packets, at least some of the network packets including control information relating to an application program and a software port associated with the application program, wherein the virtual network switch is connected or capable of being connected to one or more virtual network interface cards in the one or more virtual machines and wherein the application program is associated with one or more software ports;
   (b) selecting a connected virtual network interface card and a software port for the application program based at least in part on a load balancing algorithm, including applying the load balancing algorithm to both the incoming and outgoing network packets, wherein the load balancing algorithm depends at least in part on one or both of a rate of processing of network packets by the one or more virtual network interface cards and the rate of processing of network packets by the one or more software ports; and
   (c) on the basis of the load balancing algorithm, causing the virtual network switch to route the incoming and outgoing network packets to the selected virtual network interface card and the selected software port.

2. The method of claim 1, further comprising an operation of launching an additional virtual machine running the application program and connecting a virtual network interface card associated with the additional virtual machine to the virtual network switch, if the additional virtual machine is not already running when the virtual network interface card is selected by the load balancing algorithm, such that the additional virtual machine is launched in response to the selecting that is based on the load balancing algorithm.

3. The method of claim 1, further comprising an operation of launching the application program in a virtual machine associated with a virtual network interface card connected to the virtual switch, if the application program is not already running when a software port associated with the launched application program is selected by the load balancing algorithm, such that the application program in the virtual machine is launched in response to the selecting that is based on the load balancing algorithm.

4. The method of claim 1, further comprising an operation of monitoring and reporting on health metrics for the one or more virtual network interface cards connected to the virtual switch, wherein the health metrics include measures of performance and availability.

5. The method of claim 1, further comprising an operation of monitoring and reporting on health metrics for the one or more software ports for the application program, wherein the health metrics include measures of performance and availability.

6. The method of claim 1, wherein the one or more virtual machines are running the same application program.

7. The method of claim 1, wherein the one or more virtual network interface cards are associated with the same virtual machine.

8. The method of claim 1, wherein the load balancing algorithm is a dynamic feedback load balancing algorithm.

9. Software encoded in one or more non-transitory computer-readable media for execution by a processor and when executed operable to:
   receive a plurality of incoming network packets destined for an application program running on a plurality of virtual machines, each of which is connected to a distributed virtual switch by a virtual network interface card, wherein each of the incoming network packets includes control information relating to one or more of layers 4-7 of the Open Systems Interconnection Basic Reference (OSI) Model and wherein the distributed virtual switch enables inheritance of policies applicable to a cluster of host systems;

load balance the incoming network packets among the plurality of virtual machines at least in part on the basis of the control information and the rate of processing of the network packets by the virtual network interface cards receive a plurality of outgoing network packets from the application program running on the plurality of virtual machines; and load balance the outgoing network packets among a plurality of the virtual network interface cards on a basis of queues of the virtual network interface cards.

10. The encoded software of claim 9, further comprising encoded software to launch a virtual machine running the application program and connect a virtual network interface card associated with the virtual machine to the virtual network switch.

11. The encoded software of claim 9, further comprising encoded software to monitor and report on health metrics for the one or more virtual network interface cards connected to the virtual switch, wherein the health metrics include measures of performance and availability.

* * * * *